June 1, 1965 J. R. ANDERSON ETAL 3,186,937
SEPARATION OF AROMATIC HYDROCARBONS FROM
NONAROMATIC HYDROCARBONS
Filed March 6, 1962 3 Sheets-Sheet 3

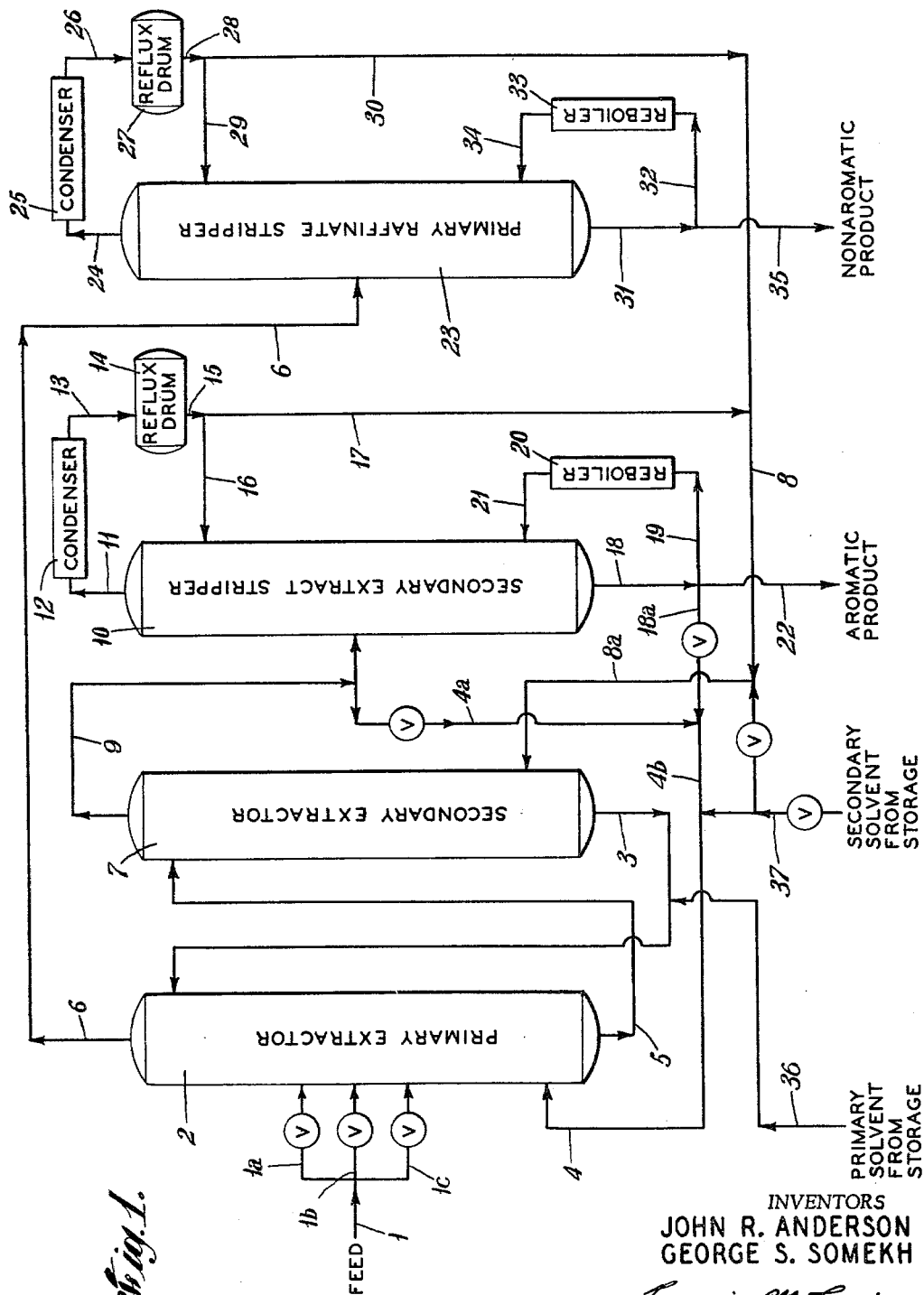

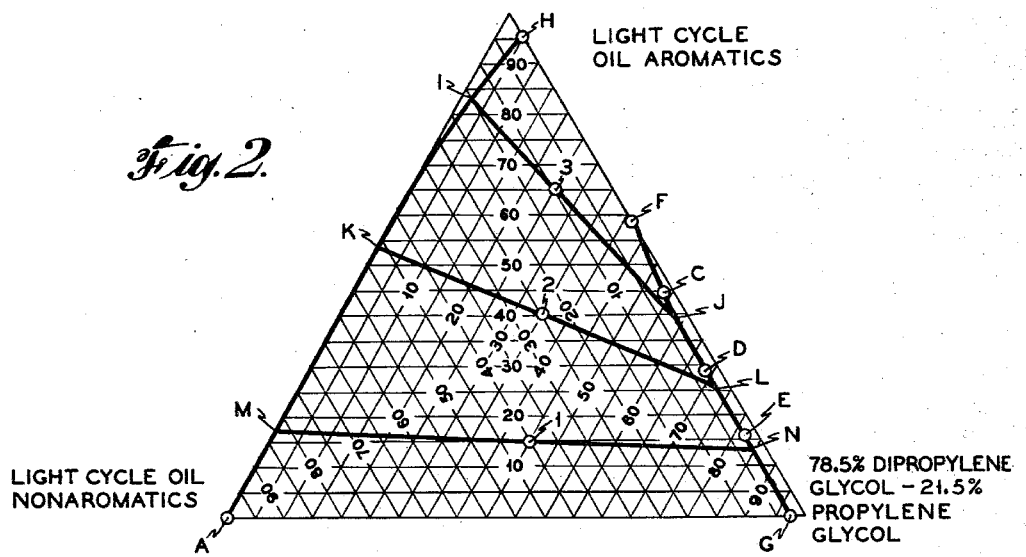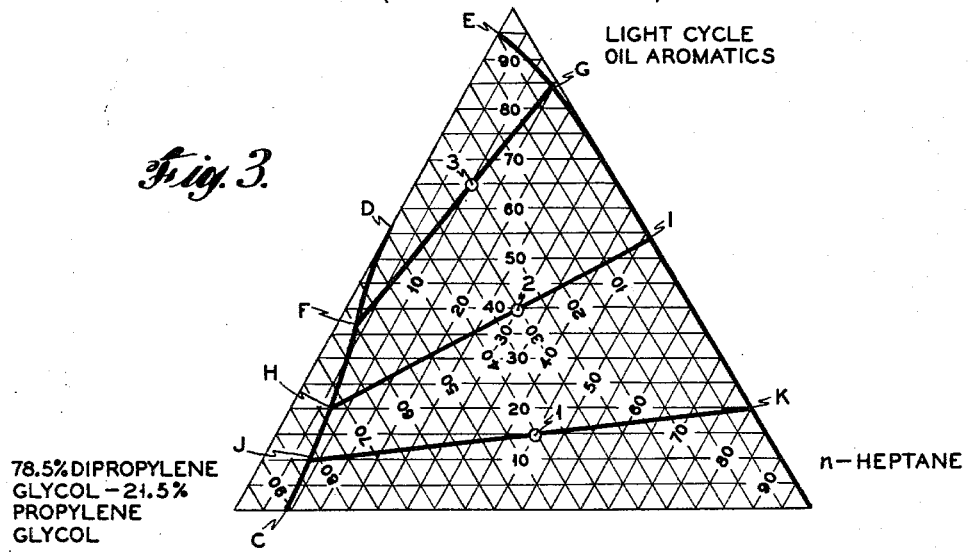

INVENTORS
JOHN R. ANDERSON
GEORGE S. SOMEKH

BY Francis M. Fajo
ATTORNEY

`United States Patent Office`

3,186,937
Patented June 1, 1965

3,186,937
SEPARATION OF AROMATIC HYDROCARBONS FROM NONAROMATIC HYDROCARBONS
John R. Anderson, Mount Kisco, and George S. Somekh, New Rochelle, N.Y., assignors to Union Carbide Corporation, a corporation of New York
Filed Mar. 6, 1962, Ser. No. 177,916
8 Claims. (Cl. 208—314)

This invention is concerned with the separation of aromatic hydrocarbons from nonaromatic hydrocarbons in mixtures containing the same such as, for example, petroleum naphthas, reformates, and cycle oils. It is particularly concerned with selective solvent extraction of aromatic hydrocarbons from nonaromatic hydrocarbons to recover pure aromatic hydrocarbons in high yields.

It is known to separate aromatic hydrocarbons such as benzene and toluene from hydrocarbon mixtures containing the same. According to known methods an aromatic-containing feed is introduced into a solvent extraction zone wherein it is countercurrently contacted with an extraction solvent such as ethylene glycol, diethylene glycol, propylene glycol, dipropylene glycol, or other higher molecular weight glycols and polyglycols. An extract phase is removed from the bottom of the extraction zone consisting of the aromatics dissoved in the extraction solvent. A raffinate phase essentially nonaromatic in character is removed overhead. This raffinate is washed with water to remove any entrained extraction solvent therefrom, and the nonaromatic hydrocarbons are recovered as overhead product. The extract phase is subjected to distillative operation, in a distillation column, using live steam to strip the aromatics from the solvent. The aromatics and the steam are removed overhead, condensed and separated into a water layer and an aromatic layer. The water is removed, reheated to steam, if desired, and reused in the process. Part of the aromatics is refluxed to the distillation zone or the extraction zone, whereas the remainder can be removed as product. In many cases the extraction solvent which is withdrawn from the bottom of the distillation zone contains some water which may have to be removed prior to recycling of the solvent to the extraction zone.

The solvent extraction process just described has several limitations. The capacity of the extraction solvent for absorption of aromatic hydrocarbons is usually poor due to the presence of water in the extraction solvent. This reduced capacity necessitates the use of large quantities of extraction solvent for efficient and quantitative extraction of the aromatics from nonaromatic hydrocarbons. Consequently the equipment required to handle such large quantities of extraction solvent is necessarily large and expensive. When low boiling extraction solvents are used, both the solvent and the water contained therein have high latent heats of vaporization. Consequently, the removal of water from the solvent becomes an expensive operation due to the necessity of application of large quantities of heat in the distillation operation. On the other hand, when high boiling solvents are used, in addition to large heat requirements, high distillation temperatures are necessary for efficient removal of water from the extraction solvent. The application of such high temperatures may result in thermal and/or oxidative degradation of the solvent, particularly in the presence of air. This, of course, reduces the efficiency of operation. Furthermore, the extraction solvents heretofore employed very often boil at or near the boiling points of the aromatic hydrocarbons which must be separated. This necessitates complicated and expensive distillation and recovery methods and apparatus for recovery of the extraction solvent.

We have now discovered that aromatic and nonaromatic hydrocarbons can be separated from each other in hydrocarbon mixtures containing the same by contacting an aromatic-containing feed in an extraction zone, hereinafter referred to as the primary extractor, with a solvent capable of selectively dissolving the aromatic fraction of said feed, which solvent is hereinafter referred to as the primary solvent. A primary extract is withdrawn from the bottom of the primary extractor consisting of aromatics dissolved in the primary solvent. The nonaromatic fraction of the feed ascends through the primary extractor wherefrom it is removed as primary raffinate. The primary extract is further contacted in a secondary extractor with a second solvent, hereinafter referred to as the secondary solvent, which solvent boils at a lower temperature than the aromatic and nonaromatic fractions of the original feed, and which secondary solvent is capable of forming an azeotrope with the primary solvent. The secondary solvent strips the aromatics from the primary extract giving a secondary extract consisting of secondary solvent, aromatic hydrocarbons, and small quantity of primary solvent, and a secondary raffinate consisting essentially of primary solvent and some secondary solvent which is removed from the secondary extractor. The secondary raffinate is recycled to the primary extractor and the secondary extract is fed to a distillation column, hereinafter referred to as secondary extract stripper, wherein the aromatics and the secondary solvent are separated by azeotropic distillation. The primary raffinate is also fed to a distillation column, hereinafter referred to as primary raffinate stripper, wherein the nonaromatic hydrocarbons are separated from the primary and secondary solvent by azeotropic distillation.

The invention will be more fully understood with reference to the drawings attached hereto and made a part of this application.

In the drawings,

FIGURE 1 is a schematic flow diagram of one illustrative embodiment of the present invention.

FIGURE 2 is a ternary miscibility diagram for a system of primary solvent-aromatic hydrocarbon and non-aromatic hydrocarbon at 25° C. and atmospheric pressure.

FIGURE 3 is a ternary miscibility diagram for a system of primary solvent-aromatic hydrocarbon and n-heptane at 25° C. and atmospheric pressure.

Figure 4:
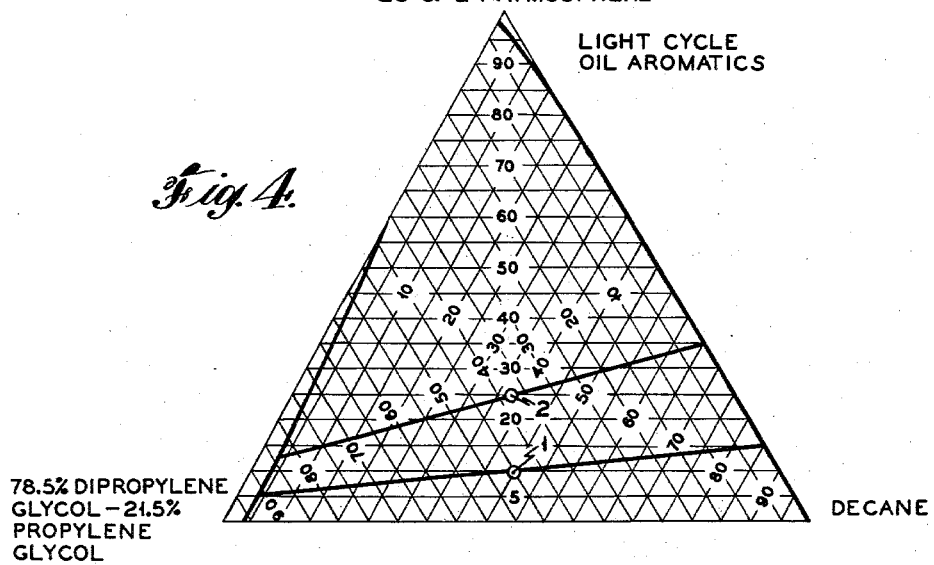
FIGURE 4 is a ternary miscibility diagram for a system of primary solvent-aromatic hydrocarbons and decane at 25° C. and atmospheric pressure.

Referring to FIGURE 1, the aromatic-containing feed is introduced through line 1 having multiple entry points such as 1a, 1b, and 1c, into a primary extractor 2 wherein it is contacted with a primary solvent countercurrently.

The feed to primary extractor 2 can be any aromatic-containing feed boiling in the temperature range of about 70° C. to 370° C. or more, such as, for example, petroleum naphthas, reformates and cycle oils. Alternatively the feed may consist of one or more aromatic hydrocarbons in admixture with one or more nonaromatic hydrocarbons. In the illustrative embodiment herein, the feed consists of a mixture of approximately equal proportions of aromatic and nonaromatic hydrocarbons. The feed is generally introduced at about the mid-section of extractor 2, though it may also be introduced at a higher or lower point. Primary extractor 2 is of a type generally employed in the art, being an extraction tower, preferably of multi-stage design, provided with packings such as Raschig rings or Berle saddles, or it may be equipped with perforated or bubble-cap trays for facilitating liquid-liquid contact.

A primary extract consisting essentially of the aromatic fraction of the feed dissolved in the primary solvent is withdrawn from the bottom of primary extractor 2, through line 5. The nonaromatic fraction of the feed ascends through primary extractor 2 wherefrom it is removed as a primary raffinate through line 6 and conveyed to primary raffinate stripper 23. The primary extract which contains some of the nonaromatic constituents of the feed is further purified before leaving primary extractor 2 by a reflux which is introduced into the lower section of primary extractor 2 via line 4 as will hereinafter be discussed.

The primary extract which is withdrawn through line 5 is conducted therethrough and is introduced into a secondary extractor 7 wherein said primary extract is contacted with a secondary solvent countercurrently. The secondary solvent strips the aromatics from the primary extract, and a secondary extract consisting of secondary solvent, aromatics and a small quantity of entrained primary solvent leaves secondary extractor 7 through line 9. A secondary raffinate consisting of the primary solvent and a small quantity of secondary solvent is withdrawn from secondary extractor 7 and recycled through line 3 to primary extractor 2. The secondary solvent leaves primary extractor 2 through line 6 along with the primary raffinate.

The secondary extract is fed through line 9 into a secondary extract stripper 10 wherein the secondary solvent and the primary solvent are removed as an azeotrope through line 11, by azeotropic distillation. The azeotropic mixture is condensed in condenser 12, and the distillate enters reflux drum 14 via line 13. The distillate is withdrawn from reflux drum 14 by line 15, partly returned to the secondary extract stripper 10 as reflux via line 16, and the remainder is recycled through lines 17, 8 and 8a to secondary extractor 7. The primary solvent contained in this recycle stream passes into the lower section of secondary extractor 7 wherefrom its is withdrawn through said line 3 along with the secondary raffinate. The aromatic hydrocarbons are withdrawn from the bottom of the secondary extract stripper 10 through line 18, partly recirculated through line 19, vaporized in reboiler 20, and returned to the lower section of stripper 10 through line 21. These returned vapors serve to further purify the aromatic content in the lower section of stripper 10. Thus essentially pure aromatics can be withdrawn through lines 18 and 22 as the desired product. Reboiler 20 also serves to supply the heat required to carry out the stripping operation in secondary extract stripper 10.

The primary raffinate is introduced through line 6 into a primary raffinate stripper 23 wherein the secondary solvent and the primary solvent are removed as an azeotrope, by azeotropic distillation, through line 24, condensed in condenser 25, and the distillate enters a reflux drum 27 via line 26. The distillate is withdrawn from reflux drum 27 through line 28, partly returned to said stripper 23, via line 29, and the remainder is recycled via lines 30, 8 and 8a to secondary extractor 7. The nonaromatic hydrocarbons are withdrawn from the bottom of stripper 23 through line 31, partly recirculated via line 32 through reboiler 33 wherein it is vaporized and returned to said stripper 23 via line 34. The returned vapors serve to purify the nonaromatic content of the lower section of said stripper 23, and essentially pure nonaromatic hydrocarbons can be withdrawn through lines 31 and 35 as product. Reboiler 33 also serves to supply the heat necessary for operation of said stripper 23.

Both the primary solvent and the secondary solvent are essentially completely recovered and reused in the process. The primary solvent is supplied from storage through line 36 and the secondary solvent is supplied from storage through line 37. Since some secondary solvent loss may be experienced during the process, make-up secondary solvent may be supplied through line 37.

The reflux through line 4 to the primary extractor 2 as hereinbefore described can be either pure aromatics, pure nonaromatics, or any mixtures thereof depending upon the operating conditions as well as on the feed, and the solvent system which is employed. Line 4a branching from line 9 carries a reflux having a ratio of aromatics to nonaromatics which is essentially the same as that of the secondary extract in line 9. This ratio can be varied and adjusted to any desired ratio of aromatics to nonaromatics. For example, when pure aromatic reflux is desired, all the valves in lines 4a and 37 are closed and the aromatic hydrocarbons from the bottom of secondary extract stripper 10 are withdrawn through said line 18 and the required quantity of reflux is recycled via lines 18a, 4b and 4 to the primary extractor 2. Similarly when the reflux required is purely nonaromatics the valves in lines 4a and 18a remain closed and the nonaromatic hydrocarbons can be supplied through the secondary solvent line 37. When the reflux required is a mixture of aromatic and nonaromatic hydrocarbons, the valve in line 4a is opened and the additional quantities of aromatics or nonaromatics are supplied through lines 18a or 37 aforesaid. The reflux to the primary extractor 2 preferably has the same ratio of aromatics to nonaromatics as that of the feed to said extractor 2.

The primary solvents which are generally employed for the extraction of aromatic hydrocarbons from nonaromatic hydrocarbons in primary extractor 2 are water-free, water-soluble selective solvents such as lower polyalkylene glycols, for example, dipropylene glycol, tripropylene glycol, dibutylene glycol, tributylene glycol, and higher molecular weight water-soluble glycols of this series, or mixtures thereof. The selectivity of these solvents for the absorption of aromatics can be improved by the addition to the solvent of so-called antisolvents. When antisolvents such as ethylene glycol, diethylene glycol, and higher molecular weight glycols of this series, propylene glycol, butylene glycol, or any mixture of such glycols are used in conjunction with the primary solvent, the selectivity of the primary solvent for the absorption of aromatic hydrocarbons is effectively increased. Small quantities of water have also been found to improve the selectivity of solvents for absorption of aromatics though it adversely effects the capacity of the solvent to dissolve aromatic hydrocarbons. However, water may sometimes be employed as an antisolvent. The solvent-antisolvent system which is employed in the illustrative embodiment herein consists of a mixture of 78.5 volume percent dipropylene glycol and 21.5 volume percent propylene glycol (propylene glycol is used herein as the antisolvent). The choice of solvents and antisolvents is generally dependent upon the composition of the feed to the primary extractor, the degree of separation required, and other operating variables which are involved.

Under certain conditions the antisolvents may be used in lieu of the primary solvents in the primary extraction step.

Other solvents can be used as primary solvents among which are "Cellosolve" solvents such as alkyl ethers of ethylene glycol, for example, methyl "Cellosolve," ethyl "Cellosolve," propyl "Cellosolve," and butyl "Cellosolve"; "Carbitol" solvents such as alkyl ethers of diethylene glycol, for example, methyl "Carbitol," ethyl "Carbitol," propyl "Carbitol," and butyl "Carbitol."

The solvent to feed ratio employed in primary extractor 2 is usually from 0.1/1 to 10/1, and preferably is 0.5/1 to 5/1 on a volume basis.

The reflux to the lower section of primary extractor 2 may be pure aromatics or pure nonaromatics, but it is preferably a mixture hving a ratio of aromatics to nonaromatics which is essentially the same as that of the feed to primary extractor 2. The reflux will be further discussed hereinafter. The ratio of reflux to feed employed is from 0 (corresponding to operations in which no reflux is required) to 10/1, but preferably this ratio is from 0.1/1 to 2/1 on a volume basis.

The primary extractor 2 can be operated in the temperature range of about 25° C.–400° C. and in the pressure range of about 15–500 p.s.i.a., but preferably, the temperature range is about 80° C.–300° C. and the pressure is about 15–200 p.s.i.a.

The secondary solvents which are employed to strip the aromatics from the primary extract in secondary extractor 7 are nonaromatic hydrocarbons (generally paraffinic and cycloparaffinic) which boil at lower temperatures than the aromatic and nonaromatic fractions of the feed to primary extractor 2. Although secondary solvents boiling in the range of about 100° C.–400° C. or more can be used, we prefer solvents boiling in the range of about 120° C.–300° C. Furthermore, the secondary solvent must be capable of forming an azeotrope with the primary solvent as will hereinafter be discussed.

The solvent to feed ratio (feed being the primary extract) to secondary extractor 7 is usually 0.05/1 to 2/1, and preferably is 0.1/1 to 1/1 on a volume basis.

Secondary extractor 7 is also of the type generally used in the art and, like primary extractor 2, it is preferably of multi-stage design, and is either packed, or equipped with appropriate trays for facilitating liquid-liquid contact.

The secondary extractor 7 can be operated in the temperature range of about 25° C.–400° C. and in the pressure range of about 15–500 p.s.i.a., but preferably, the temperature range is about 80° C.–300° C. and the pressure range is about 15–200 p.s.i.a.

Both the secondary extract stripper 10 and the primary raffinate stripper 23 can be operated in the temperature range of about 25° C.–400° C. and pressure range of about 0–500 p.s.i.a., and preferably in the temperature range of about 100° C.–300° C. and pressure range of about 0–200 p.s.i.a.

Although the present invention has heretofore been described with certain degrees of particularity, it is to be understood that the process of this invention is flexible and capable of various modifications without departing from the spirit of the invention herein. The operating variables involved in the process of this invention can be varied and adjusted to achieve the required separation for a given hydrocarbon feed mixture and such adjustments and modifications are within the scope of knowledge of persons skilled in the art.

We have discovered that the most economical operating method is one in which the extractors and the strippers are all operated at about the same temperatures and pressures. This minimizes heat exchange requirements, and considerable economic improvement is realized thereby. The operating temperatures in all cases however must not be so high as to cause thermal degradation of the solvent or decomposition of the hydrocarbons.

Referring to FIGURE 2, the ternary miscibility diagram was established by preparing solutions of known composition of two components such as aromatics-nonaromatics, and aromatics-solvent solution. Light cycle oil boiling in the range of 200° C.–320° C. was the source of aromatics used herein. The non-aromatic hydrocarbons used were light cycle oil nonaromatics, and the solvent system employed was a mixture of 78.5 volume percent dipropylene glycol and 21.5 volume percent propylene glycol. The known solutions were then titrated with the third component until a drop would no longer dissolve in the solution. The composition of each mixture was calculated from the relative quantities of materials used in the experiment. This procedure was repeated to obtain several points which were used to draw the extract curve GF and the raffinate curve AH.

A mixture of the light cycle oil aromatics, light cycle oil nonaromatics, and a solvent of the composition hereinbefore described was charged to a separatory funnel, shaken thoroughly several times and allowed to stand and separate into two phases. This procedure was repeated until the relative volumes of the phases no longer changed. The extract phase was then discarded and the composition of the raffinate phase was determined by refractive index measurements. A tie line representing the equilibrium condition was drawn through the point representing the raffinate composition and the point in the immiscible region representing the total composition of the original mixture (points 1, 2 and 3 in the ternary diagram of FIGURE 2). The extract composition was then determined by extending the tie line and determining its intersection with the extract curve. The point of intersection represents the extract composition.

Three experiments were conducted and three tie lines were accordingly obtained which are represented by the lines IJ, KL, and MN in FIGURE 2. The experimental results are indicated in Table I below.

The above experiments were conducted at 25° C. and at atmospheric pressure.

TABLE I

*Batch extractions with 78.5 volume percent dipropylene glycol—21.5 volume percent propylene glycol at 25° C. and atmospheric pressure*

| Aromatic hydrocarbons in charge (volume percent) | Solvent/charge (volume/volume) | Purity of aromatic hydrocarbons in extract free of primary solvent (volume percent) | Purity of aromatic hydrocarbons in raffinate free of primary solvent (volume percent) | Aromatic hydrocarbons recovered in extract (volume percent) |
|---|---|---|---|---|
| 86.8 | 0.333 | 94.9 | 84.5 | 28.1 |
| 61.5 | 0.538 | 91.2 | 53.6 | 38.8 |
| 27.2 | 0.818 | 83.5 | 16.9 | 50.9 |

Referring to FIGURE 3, the ternary miscibility diagram and the necessary tie lines were constructed by the same pocedure as heretofore described in connection with FIGURE 2. N-heptane was used as a typical secondary solvent to extract the aromatic hydrocarbons from the glycol solvent. The points in the immiscible region representing the composition of the original known solutions are represented by points 1, 2 and 3 in FIGURE 3. The results of three experiments are shown in FIGURE 3 in Table II below. These experiments were also conducted at 25° C. and atmospheric pressure.

TABLE II

*Batch extractions with n-heptane at 25° C. and atmospheric pressure*

| Aromatic hydrocarbons in charge (volume percent) | Solvent/charge (volume/volume) | Purity of aromatic hydrocarbons in extract free of secondary solvent (volume percent) | Purity of aromatic hydrocarbons in raffinate free of secondary solvent (volume percent) | Aromatic hydrocarbons recovered in extract (volume percent) |
|---|---|---|---|---|
| 72.3 | 0.111 | 98.5 | 37.6 | 77.3 |
| 57.1 | 0.428 | 99.9 | 21.3 | 79.8 |
| 27.1 | 0.818 | 99.9 | 10.8 | 67.6 |

FIGURE 4 may be employed to depict yields of extract and raffinate which may be recovered in a typical secondary extraction, using decane as the secondary solvent. The manner of construction and use of this diagram is similar to those of FIGURES 2 and 3.

Although FIGURES 2, 3 and 4 were constructed at 25° C. and atmospheric pressure, they can be similarly constructed at any other temperature and pressure.

Figure 5:
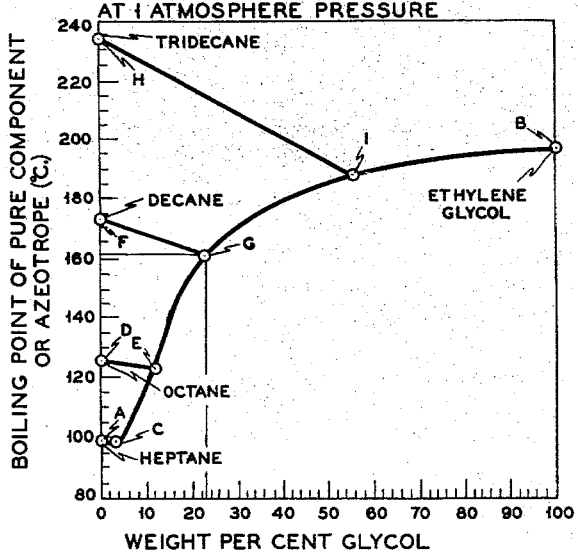
FIGURE 5 is a boiling point-composition diagram for binary azeotropes of nonaromatic hydrocarbons with ethylene glycol at atmospheric pressure.

Referring to FIGURE 5, the curve AB represents the variation of boiling points with the weight percent of ethylene glycol in binary mixtures of ethylene glycol and aliphatic hydrocarbon. Points A, D, F, and H represent the boiling temperatures of the pure aliphatic hydrocarbons used herein as the secondary solvents. These points represent heptane, octane, decane, and tridecane, respectively. Points C, E, G, and I represent the azeotropic temperatures of a mixture of each of the above-named aliphatic hydrocarbons with ethylene glycol. For example, point G is the azeotrope formed between decane and ethylene glycol, having a boiling temperature of approximately 161° C. and an ethylene glycol content of approximately 23 weight percent based on a mixture of decane and ethylene glycol.

The lines connecting the points representing the boiling points of the pure hydrocarbons with those of their corresponding azerotropes are approximately parallel. Therefore, if the boiling point of a hydrocarbon is known, the azeotropic temperature, and the corresponding weight percent of ethylene glycol can be determined approximately by extending a line through the point representing the boiling point of the hydrocarbon parallel to any one of the azeotropic lines such as DE or FG, and determining the intersection with the curve AB. Conversely, if the azeotropic temperature is known the hydrocarbon boiling point can be determined by a similar procedure.

From FIGURE 5, it will be seen that temperatures outside the range of 100° C.–300° C. are beyond the limit represented by the azeotropic region and therefore they are not the preferred operating temperatures. It is further seen that the azeotropic temperature depends upon the system of solvents employed to carry out the desired extraction.

Correlations similar to that shown in FIGURE 5 can be established using other glycols, polyglycols, alkylene glycols and polyalkylene glycols, instead of ethylene glycol.

We have also found that as the molecular weight of the nonaromatic hydrocarbon decreases, its solubility in ethylene glycol is correspondingly increased hence its removal becomes more complicated. On the other hand the boiling points of the nonaromatic hydrocarbons increase with increase in their molecular weights. This tends to complicate the separation of the secondary solvent from the aromatic product, and the nonaromatic product due to closeness of their boiling points and the possibility of azeotrope formation.

It has been found preferable to use a nonaromatic secondary solvent which has a high enough molecular weight to reduce its solubility in the glycol yet have a boiling point which is lower than the aromatics and nonaromatics in the feed to the primary extracting tower. It has also been found that the use of higher molecular weight nonaromatic hydrocarbons as secondary solvent, which also meet the boiling point requirements aforesaid, effectively reduces the reflux quantities required for the primary extraction tower, hence resulting in more economical operation.

We have thus discovered a novel, economical, and commercially feasible method for the separation of aromatic hydrocarbons from nonaromatic hydrocarbons, using known and inexpensive equipment. The process of this invention is readily amenable to continuous operation as hereinbefore described and illustrated in FIGURE 1. Alternatively the process of our invention can also be carried out in batchwise fashion. Accordingly, the aromatic-containing feed is contacted with a primary solvent of the type hereinbefore described, in a suitable vessel such as an agitated vessel. After thorough mixing the mixture is allowed to stand and separate into two phases. The aromatic-containing extract phase is withdrawn into a second vessel wherein it is contacted with a secondary solvent aforesaid. The aromatics are thus removed by the secondary solvent wherefrom they are subsequently recovered by azeotropic distillation.

Essentially pure aromatic hydrocarbons can be obtained from any aromatic-containing feed in accordance with the process of this invention. For example, aromatic hydrocarbons useful as naphthalene precursors or benzene precursors can be obtained by the process of this invention. Mixtures of aromatic-nonaromatic hydrocarbons can also be obtained by proper choice of solvents or solvent-antisolvent systems and the other operating variables involved.

The aromatic hydrocarbons thus obtained find numerous useful applications such as solvents and intermediates in commercial and laboratory synthesis. The nonaromatic hydrocarbons separated by the method of this invention have been found to be an excellent diesel fuel.

The following examples will further illustrate but not limit the scope of the process of this invention.

EXAMPLE 1

A blend was prepared corresponding approximately to a typical secondary extract consisting of a 73.0/25.0/2.0 volume percent mixture of aromatic hydrocarbons/decane/and primary solvent (78.5% dipropylene glycol/21.5% propylene glycol). The aromatic hydrocarbons were light cycle oil aromatics boiling in the temperature range of about 200° C.–320° C. Two hundred cc. of this blend was charged to a laboratory-scale batch distillation apparatus. The mixture was azeotropically distilled at atmospheric pressure and at a reflux ratio of 3:1. The initial distillate was recovered at 100° C. The distillate was an azeotropic mixture of primary solvent and secondary solvent (decane). As the distillate was condensed and cooled it separated into two phases which were removed continuously. The overhead temperature rose gradually to 154° C., after which a homogeneous distillate was recovered. The distillation was then discontinued. Approximately 59 cc. of distillate was recovered corresponding to 29.5 vol. percent of the initial charge to the distillation column.

Analyses of the distillate and the contents of the distilling flask indicated that substantially all of the primary solvent was recovered in the distillate. The recovery of the primary solvent was 96.7% of the primary solvent present in the original charge. The contents of the flask of the distillation apparatus was essentially aromatic hydrocarbons.

EXAMPLE 2

A blend was prepared corresponding approximately to a typical primary raffinate consisting of a 80.0/18.0/2.0 vol. percent mixture of light cycle oil nonaromatic hydrocarbons/decane/and primary solvent (78.5% dipropylene glycol/21.5% propylene glycol). Two hundred cc. of this blend was charged to a laboratory-scale distillation apparatus. The mixture was azeotropically distilled at atmospheric pressure and at a reflux ratio of 3:1. The initial distillate was recovered at 97° C. The distillate was an azeotropic mixture of primary and secondary solvent (decane). As the distillate was condensed and cooled it was separated into two phases which were removed continuously. The overhead temperature rose gradually to 175° C., after which a homogeneous distillate was recovered. The distillation was then discontinued. Approximately 37 cc. of distillate was recovered corresponding to 18.75 vol. percent of the initial charge to the distillation column.

Analyses of the distillate and the contents of the distilling flask indicated that substantially all of the primary solvent was recovered in the distillate. The recovery of the primary solvent was 98.0 vol. percent of the primary solvent in the original charge. The contents of the flask of the distillation apparatus was essentially nonaromatic hydrocarbons.

What is claimed is:

1. A method for the recovery of aromatic hydrocarbons from hydrocarbon mixtures thereof with nonaromatic hydrocarbons which comprises the steps of (a) contacting said hydrocarbon mixture in a primary contacting zone at a temperature range of 25° to 400° C. and a pressure range of 15–500 p.s.i.a., with a primary solvent selected from the group consisting of water-soluble lower glycols and lower polyalkylene glycols, wherein said aromatic hydrocarbons are selectively dissolved, (b) separating a primary solvent-aromatic hydrocarbons phase, and an essentially nonaromatic hydrocarbons phase, (c) contacting said primary solvent-aromatic hydrocarbons phase in a secondary contacting zone at a temperature range of 25° C. to 400° C. and a pressure range of 15–500 p.s.i.a., with a secondary solvent consisting of paraffinic hydrocarbons having a lower boiling point than the aromatic hydrocarbons and nonaromatic hydrocarbons in said hydrocarbon mixture charged to said primary contacting zone, and which secondary solvent is capable of forming an azeotrope with said primary solvent, and which secondary solvent boils in the temperature range of 120° to 300° C., wherein said aromatic hydrocarbons from said primary solvent-aromatic hydrocarbons phase are dissolved, (d) removing a secondary solvent-aromatic hydrocarbons phase from said secondary contacting zone, and (e) subjecting said secondary solvent-aromatic hydrocarbons phase to azeotropic distillative operation in a distillation zone at a temperature range of 25° C. to 400° C. and a pressure range of 0 to 500 p.s.i.a. to recover the aromatic hydrocarbons.

2. The method of claim 1 wherein the temperature range in said primary contacting zone and said secondary contacting zone is from 80° C. to 300° C. and the pressure range in said zone is from 15 to 200 p.s.i.a., and the temperature range in said distillation zone is from 100° C. to 300° C. and the pressure range in said distillation zone is from 0 to 200 p.s.i.a.

3. The method of claim 1 wherein the primary solvent is a mixture of 78.5 volume percent dipropylene glycol and 21.5 volume percent propylene glycol, and the secondary solvent is an aliphatic hydrocarbon boiling in the temperature range of 120° C. to 300° C.

4. The method of claim 1 wherein the primary solvent employed is a mixture of 78.5 volume percent dipropylene glycol and 21.5 volume percent propylene glycol, and the secondary solvent is decane.

5. A method for the recovery of aromatic hydrocarbons from hydrocarbon mixtures thereof with nonaromatic hydrocarbons which comprises the steps of (a) continuously contacting said hydrocarbon mixture in a primary contacting zone at a temperature range of 25° C. to 400° C. and a pressure range of 15 to 500 p.s.i.a., with a primary solvent selected from the group consisting of water-soluble lower glycols and lower polyalkylene glycols, wherein said aromatic hydrocarbons are selectively dissolved, (b) separating a primary extract phase and a primary raffinate phase, (c) contacting said primary extract phase in a secondary contacting zone at a temperature range of 25° C. to 400° C. and a pressure range of 0 to 500 p.s.i.a., with a secondary solvent consisting of paraffinic hydrocarbons having a lower boiling point than the aromatic hydrocarbons and nonaromatic hydrocarbons in said hydrocarbon mixture charged to said primary contacting zone, and which secondary solvent is capable of forming an azeotrope with said primary solvent, and which secondary solvent boils in the temperature range of 120° C. to 300° C., removing from said secondary contacting zone a secondary extract phase consisting of secondary solvent, aromatic hydrocarbons, and primary solvent, and a secondary raffinate consisting of primary solvent and secondary solvent, recycling said secondary raffinate to said primary contacting zone, introducing said secondary extract to a distillation zone wherein the primary solvent and secondary solvent are removed by azeotropic distillation at about 25° C. to 400° C. and about 0 to 500 p.s.i.a. and the aromatic hydrocarbons are recovered in high purity; subjecting said primary raffinate from said primary contacting zone to azeotropic distillation at about 25° C. to 400° C. and about 0 to 500 p.s.i.a. in a second distillation zone, and recovering the nonaromatic hydrocarbons therefrom.

6. The method of claim 5 wherein the temperature range in said primary contacting zone and said secondary contacting zone is 80° C. to 300° C. and the pressure range is 15 to 200 p.s.i.a., and the temperature range in said distillation zone is 100° C. to 300° C. and the pressure range is 0 to 200 p.s.i.a.

7. The method of claim 5 wherein the primary solvent is a mixture of 78.5 volume percent dipropylene glycol and 21.5 volume percent of propylene glycol, and the secondary solvent is an aliphatic hydrocarbon boiling in the temperature range of 120° C. to 220° C.

8. The method of claim 5 wherein the primary solvent is a mixture of 78.5 volume percent dipropylene glycol and 21.5 volume percent propylene glycol, and the secondary solvent is decane.

References Cited by the Examiner

UNITED STATES PATENTS

| | | | |
|---|---|---|---|
| 2,225,396 | 12/40 | Anderson | 208—317 |
| 2,463,479 | 3/49 | Denton et al. | 208—313 |
| 2,773,006 | 12/56 | Carver et al. | 208—312 |
| 2,786,085 | 3/57 | Bloch | 208—314 |
| 2,928,788 | 3/60 | Jezl | 208—314 |
| 2,936,283 | 5/60 | Hutchings | 208—321 |

ALPHONSO D. SULLIVAN, *Primary Examiner.*